April 29, 1952   V. C. BLOODGOOD   2,594,855
ANIMAL TRAP
Filed Oct. 17, 1950   2 SHEETS—SHEET 1

INVENTOR.
Vivian C Bloodgood,
BY
Brown, Jackson, Boettcher & Dienner
attys.

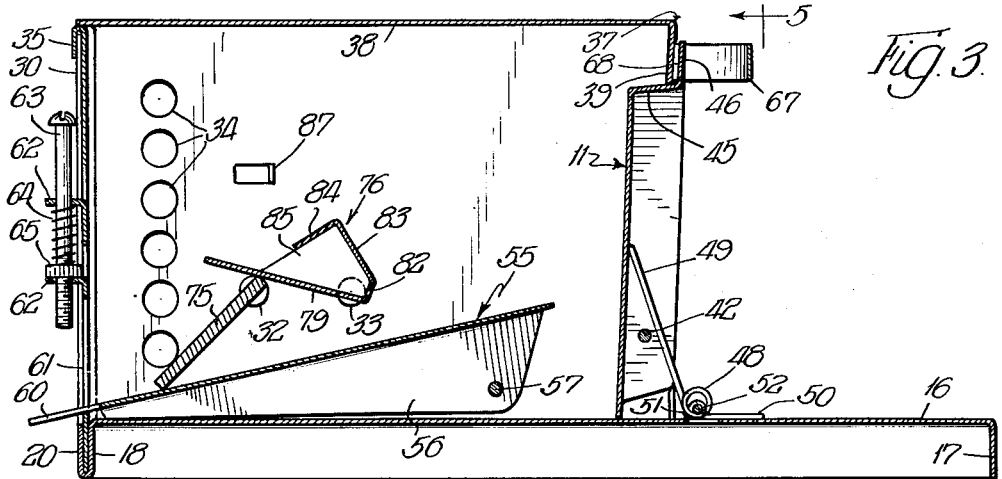
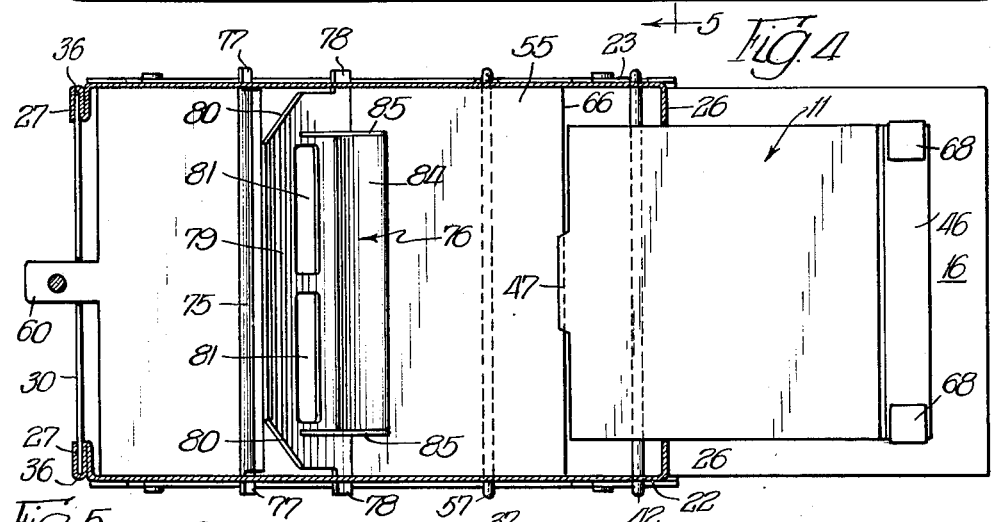
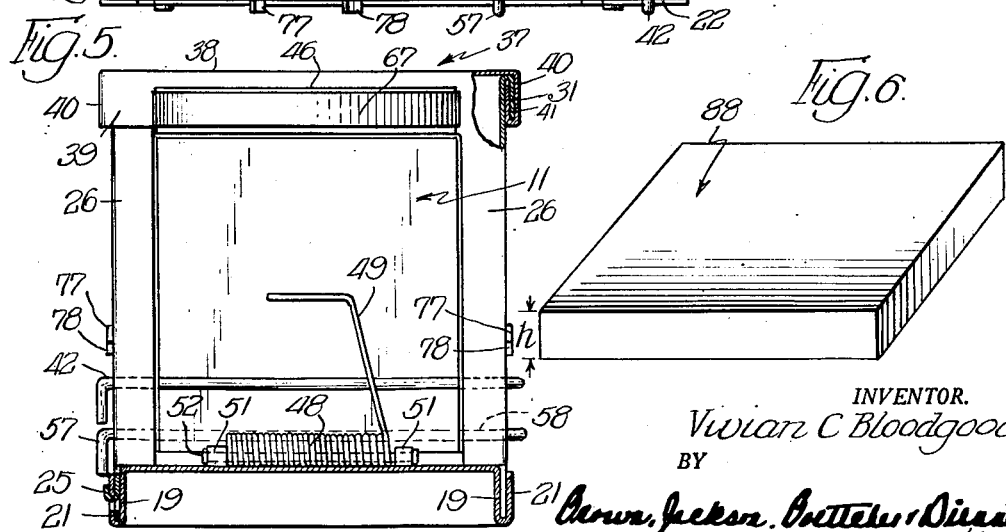
INVENTOR.
Vivian C Bloodgood,
BY

Patented Apr. 29, 1952

2,594,855

UNITED STATES PATENT OFFICE 2,594,855

ANIMAL TRAP

Vivian C. Bloodgood, Cass County, Mich.

Application October 17, 1950, Serial No. 190,604

7 Claims. (Cl. 43—61)

My invention relates to an improved animal trap especially adapted for entrapping alive, various small animals and pests such as mice, rats, squirrels, birds, rabbits and the like.

Briefly my new and improved trap contemplates a collapsible or knock down cage having a spring actuated trap door over the entrance thereto. The trap door, in its open position, is spring loaded and by means of a unique tripping arrangement, which is initiated by the impact of a falling weight, the trap door is adapted to be released and swung arcuately upward to securely cover over the cage entrance to confine an animal in the cage.

One of the main objects of my invention is to disclose a new and improved trap for small animals which may be easily disassembled and packaged or stored in a knocked down condition.

Another important object of my invention is to provide an animal trap that has a sensitive and positive tripping mechanism whereby the trap is assured of efficient operation.

A further object of my invention is to provide a strong and sturdy trap especially adapted for capturing small animals alive and uninjured.

These and further objects and features of my invention will be recognized by one skilled in the art from the following description and with reference to the accompanying drawings.

In the drawings:

Figure 3 is a cross sectional view similar to Figure 2 and cut along a similar sectional trace, but showing the closed positioning of the working parts of my trap;

Figure 4 is a top plan view of my trap with parts thereof in cross section, and taken substantially along line 4—4 of Figure 2;

Figure 5 is an end elevational view with parts thereof in cross section, taken substantially along line 5—5 of Figure 3, looking in the direction of the arrows and showing the trap door closed; and Figure 6 is a perspective view of a package or container, at a reduced scale, of a type which is adapted to house my trap in its knocked-down condition.

Figure 1:
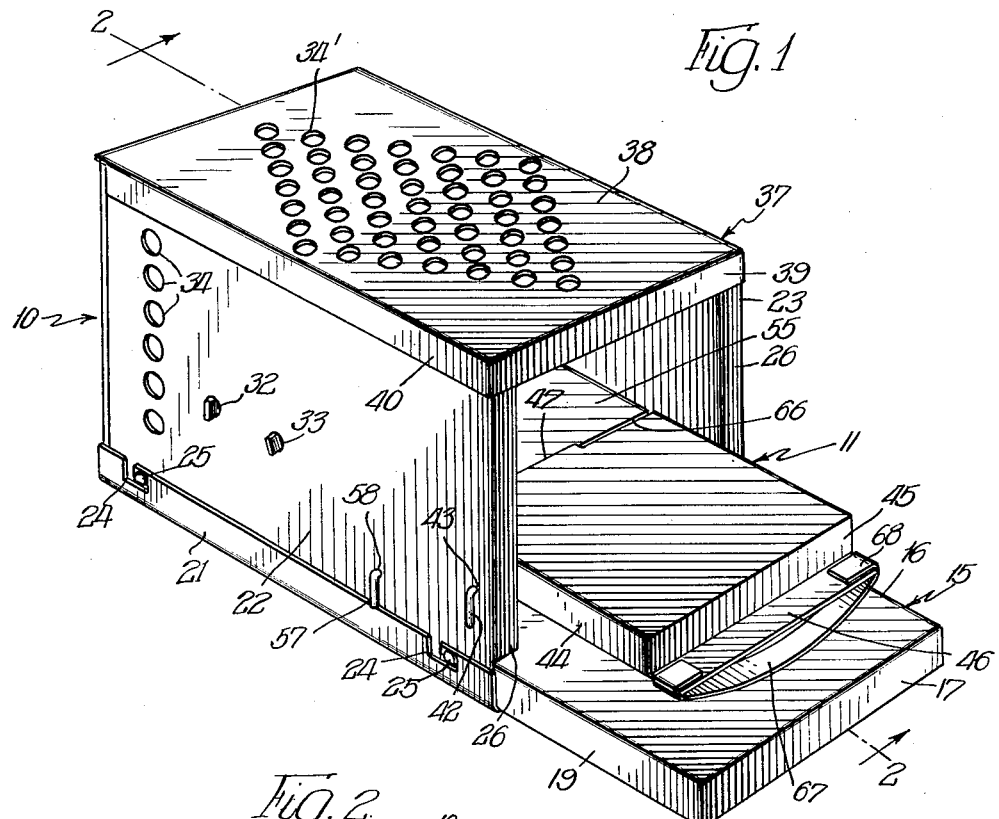
Figure 1 is a perspective view of my trap in an open position with the trap door thereof set to snap closed.
Figure 2:
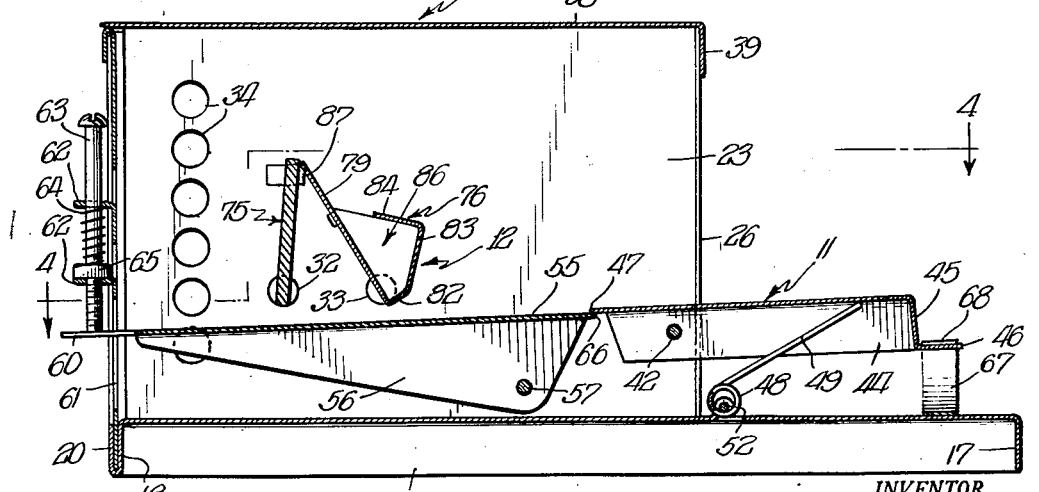
Figure 2 is an elevational cross sectional view taken substantially along line 2—2 of Figure 1 showing the relation of the various working parts of my trap in their "cocked" or set condition.

Referring now to Figures 1 and 2 of the drawings, it will be recognized that my trap may be divided into three main cooperating sections, namely, a cage assembly 10, a trap door 11, and a triggering mechanism 12 for controlling the actuation of the trap door; all parts of my trap preferably being made of non-corrosive stainless steel or an equivalent material.

The cage 11, as clearly seen in Figures 1 and 2, comprises a generally rectangular base 15 formed as an open bottomed rectangular box comprising a rectangular top plate 16, having right angularly bent, downwardly reaching front and back end walls 17 and 18, respectively, and similarly formed side walls 19, 19. The front end wall 17 is herein illustrated as comprising a single thickness of metal in contrast to the back end wall 18 which is folded reentrantly and upwardly on itself to form an outer lip or flange 20 which lies in a spaced parallel plane from wall 18 and is of substantially equal width therewith. Lip 20 and wall 18 thus formed provide a female connection of a sliding type joint which I employ in interfitting all of the various parts of my cage section 10. The side walls 19 of the base 15 are likewise provided with upwardly turned outer flanges or lips 21 which extend from the rear end wall 18 toward front end wall 17 a distance equal in length to that of side walls 22 and 23 of my cage. Additionally, the side flanges 21 are provided each with a pair of spaced apart bayonet slots 24 for the reception therein of conventional lugs 25 rigidly associated with the lower edges of the cage side walls 22 and 23. Each side wall 22 or 23 is provided with an inwardly turned lip 26 at its forward edge adapted to extend over base member 15 so that the lower ends of the lips 26 lie in abutting engagement with the upper surface of base top plate 16 in assembly. The rearward edge of each side wall is characterized by a double reentrantly bent flange 27 which forms a female portion of a sliding joint connection for mounting a vertical rear cage wall 30, as will appear presently. Still another lip member 31, as seen in Figure 5, is formed along the upper edge of the side walls 22 and 23, being turned outwardly and downwardly therefrom to form an interlocking female connector similar to that formed by lips 21.

Side walls 22 and 23 are further fitted with a pair of side by side spaced pivot holes 32 and 33, for purposes of supporting portions of the trigger mechanism 12 as will appear presently. A plurality of air holes 34 are also formed in the side walls to permit fresh air to enter the cage so that an animal caught therein will not suffocate.

Rear wall 30 is herein shown as a planar sheet of metal having a downwardly turned upper edge 35, which in assembled position is adapted to overhang and lock with the upper end of the two lips 27 associated with the rear edge of side walls 22 and 23. The lateral edges of the rear wall 30 are slidingly mounted inside of the lip 27 in the channeled openings 36 formed by the double reentrant bends thereof, as seen clearly in Figure 4. The lower edge of rear wall 30 is likewise received between the rear end wall 18 and the outer lip 20 formed at the rearward end of base member 15.

For purposes of completing the cage assembly 10, I have provided a top wall member 37 comprising a rectangular top plate 38 turned over at its front end to form a front wall 39, in a manner similar to the formation of front wall 17 of base 15. The lateral or side edges of plate 38 are likewise turned over downwardly to form side walls 40 having an inner lip or flange portions 41 formed as an upwardly turned, reentrant continuation of plate 38 for sliding interconnection with the female connections formed by the downwardly turned flanges 31 of the side walls 22 and 23. This latter interfitting relationship may best be seen in the broken away section of Figure 5. A plurality of air holes 34' are also formed in the plate 38 of the cover for ventilating the cage.

Thus it is seen that to assemble the cage it is merely necessary to first slidingly interengage the lower edges of the side walls 22 and 23 with the female connections formed by side walls 19 and flanges 21 of the base 15; these members being locked in position by means of the interrelated bayonet slots 24 and lugs 25. The end wall 30 is then slidingly interfitted in the openings 36 formed by the folded flanges 27 of the side walls, with the lower edge of end wall 30 interfitting between flange 20 and rear wall 18 of the base. The top 37 is interlocked with the side walls by sliding its flange members 41 between the side walls 22, 23 and their associated downwardly turned upper flange members 31.

The cage 10, it will be observed, is open at its forward end to form an entry therefor. To provide a completely enclosed cage, I have utilized a trap door 11 which, as seen in Figures 1–5, is pivotally mounted on a horizontal removable pivot rod 42 reaching transversely of the cage side walls 22, 23 and fitting through suitable openings 43 formed therein for this purpose. The trap door 11 is provided with downwardly turned side walls 44, through which rod 42 is inserted, near the lower end of the door, and a downwardly turned upper end wall 45 having an outer skirted platform 46 formed therewith so as to lie in parallel relation to the plane of door 11. Door 11 is of sufficient width to close over the cage opening between the inwardly turned lips 26 of sidewalls 22, 23 and when the door is in a vertical closed position, platform 46 thereof abuts flange 39 of the top cover 37 to arrest further closing movement of the door. The innermost end of door 11 is distinguished by a centrally disposed planar sear extension 47 by which the door is locked to the triggering mechanism 12 as will appear presently.

Means for urging the door arcuately upward to its closed position, as illustrated in Figure 3 of the drawings, comprises a torsion spring 48 having one end 49 thereof in engagement with the underside of door 11 and its other end 50 in engagement with plates 16 of base 15; opening movement of door 11 serving to torsionally load spring 48. The spring 48 is held in position on base 15 by means of a pair of upwardly raised loops 51, formed integrally out of plate 16 and adapted to receive a horizontal spring keeper pin 52 through their upper looped ends; one such loop 51 lying adjacent either end of spring 48, as shown in Figure 5.

The triggering mechanism 12 comprises a trap door trip plate 55 adapted to lie registeringly within the cage 10 near and substantially covering over the bottom thereof. Lateral edges of the trip plate 55 are turned downwardly to form two triangular shaped wings 56 through which a second pivot rod 57, similar to rod 42 is removably inserted. Rod 57 also projects horizontally and transversely through side walls 22 and 23 of the cage via openings 58 to form a horizontal pivotal axis for trip plate 55, much like the mounting of trap door 11. The rearward end of trip plate 55 is provided with a projecting rectangular finger 60 adapted to be received through a suitable rectangular opening 61 formed vertically in the rear wall 30 of the cage. Directly above opening 61 are located two ears 62, turned outwardly from the cage rear wall 30 and through which a threaded bolt 63 is inserted. A compression spring 64 surrounds the bolt 63 so as to extend between ears 62 and having its lower end abutting a nut 65 threadingly mounted on bolt 63, thereby resiliently holding bolt 63 in mounted position with the ears 62. The lower end of bolt 63 is adapted to contact finger 60 of the trip plate 55 for limiting its upward arcuate movement about the pivotal axis comprising rod 57. The vertical positioning of bolt 63 regulates the sensitivity of the triggering connection with sear 47 of the trap door 11, as will be recognized from the following description.

An inspection of Figure 2 of the drawings will reveal that to "set" the trap door in on "open" position, it is merely necessary to position the trip plate at the upper extremity of its clockwise travel so that with door 11 completely open a leading edge 66 of the trip plate underlies the sear extension 47 of the trap door and finger 60 abuts the lower end of bolt 63. It will be seen that spring 48, in this "door open" position reacts against door 11 to rotate it counterclockwise to its fully closed position and would do so if it were not for the underlying engagement of the trip plate leading edge 66 with sear 47 and for the static balance of the closing moment exerted by spring 48 through the abutting engagement of plate finger 60 with bolt 63.

In order to insure that the weight of an animal on open door 11 does not disturb the "open" balanced condition of the "set" trip plate and trap door, just set forth, by causing downward movement of the outer end of door 11 which would allow sear 47 and leading edge 66 to disengage to permit closing movement of door 11, vertical support must be given to the outer end of door 11 to keep it in its open "set" position. To this end I have provided a leaf spring 67 formed in a curvilinear manner with inwardly turned ends 68 which are adapted to hook over the lateral edge of platform 46 associated with door 11. It will be noted that the spring 67 bows outwardly from door 11 so that when the latter is in its open "set" position, spring 67 engages the upper surface of base plate 16 to hold the door against further opening movement. Spring 67 has the added virtue of being resiliently deflectable under vertical thrust so that in setting the triggering mechanism, door 11 may be swung downwardly beyond its fully "open set" position so that sear 47 thereof may overlap leading edge 66 of trip plate 55. Release of the vertical thrust on spring 67, after setting the trip plate as described, will then permit the bowed condition of this spring to return so that it rests lightly on top of plate 16 to support door 11 in its desired "set" position, as illustrated in Figure 2. Sear 47 will then press firmly against the leading edge of trip plate 55.

Means for causing a positive tripping of the "set" trap by the animal is provided within cage 10, comprising a striker bar 75 and a feeding trough 76. The striker bar is preferably formed from heavy metal plate stock and is generally rectangular in shape except for the projection from the lower part of its lateral edges of two pivot trunnions 77. Trunnions 77 are adapted to be inserted through pivot holes 32 formed in each of the cage side walls 22 and 23, to mount the striker bar about a horizontal pivotal axis above trip plate 55 transversely of cage 10.

Likewise the feeding trough 76 is pivotally secured between side walls 22 and 23 above trip plate 55 for pivotal rotation about a horizontal axis; trunnions 78 formed on back plate 79 thereof fitting into openings 33 in the cage sidewalls for this purpose. The feeding trough is preferably constructed of light weight metal to make its movement sensitive to the touch of the animal. The back plate 79, from which trunnions 78 project, is generally rectangular in shape having downward angularly cut upper corners 80 and two openings 81 formed therein. Back plate 79, of course, forms the back side of the feeding trough 76, with the forward portions thereof comprising a short bottom wall 82 formed at right angles with back plate 79; a front wall 83, bent obtusely upward from bottom wall 82; and a top wall 84, bent at right angles inwardly from wall 83 toward the back plate 79. End walls 85, reach inwardly from the ends of front wall 83, to cover over the ends of a bait well 86 comprising the interior of trough 76 and formed by the above described structure.

Referring to Figures 1 and 2 of the drawings, it will be seen that when the trap door 11 is held in its open position, by virtue of the overlapping relation of sear 47 and the leading edge 66 of trip plate 55, the setting of the trigger mechanism is completed by rotating striker bar 75 upwardly or clockwise so that it lies in a substantially vertical position, a little beyond upper dead center, to rest against a lug 87 projecting inwardly of the cage side wall 23. The feeding trough is next rotatably moved into contact with the striker bar so that back plate 79 thereof forms an acute angle therewith. It immediately will be recognized that an animal, in attempting to extract the bait, not shown, from the bait well 86, will necessarily have to lean over the trough to get beyond the top wall 84 thereof to reach the bait. A slight counterclockwise or downward rotation of the feeding trough toward the striker will unbalance the striker bar 75 allowing it rotatably to fall to strike trip plate 55. The trip plate in turn is rotated counterclockwise or downwardly under the impetus of the falling striker bar, resulting in the disengagement of the leading edge 66 of the trip plate and sear 47 of the trap door. Such occurring, the spring 48 urges trap door 11 upwardly counterclockwise to its "closed" position, as seen in Figure 3, to capture the animal in the cage. Removal of the live animal from the cage may be accomplished by sliding the top 37 of the cage to the right, as viewed in Figure 1, and turning the cage over to dump the animal out into a permanent housing or the like.

One of the outstanding features of a trap, such as I have described above, lies in its collapsible nature. Since all the parts of the cage are slidingly interjoined and the various parts of the trigger mechanism are pivotally mounted on removable pivot rods, the structure is adapted for ready disassembly. Further this feature makes it quite convenient to store the trap or package it for shipment in a rectangular box 88, such as I have shown in Figure 6 of the drawings. The compactness of the disassembled unit may be appreciated it is noted that the overall height ($h$) of box 88 need not exceed the height of trip plate wings 56, while the rectangular dimensions of the box are substantially equal to those of base 15.

Thus it may be seen that I have provided a new and improved trap which is adapted to be assembled readily from a knocked-down condition, is positive and efficient in its capturing action and further entraps small animals alive.

While I have herein shown one embodiment in which the several desirable features of my invention may appear, it readily will be understood that numerous changes, modifications and substitutions of equivalents may be made therein without departing from its spirit and scope. Therefore, I do not wish to be limited to the specific embodiment herein illustrated and described except as may appear in the following appended claims.

I claim:

1. An animal trap of the class described, comprising, a collapsible cage consisting of a base member, two vertical side wall members slidingly interjoined, along their lower edges, with the lateral edges of said base and removably locked thereto by means of bayonet connectors, a rear end wall, having its lateral edges slidingly interengaged with the rear edges of said side walls and having its lower edge slidingly interengaged with the rearward edge of said base, and a top wall member having its lateral edges slidingly interjoined with the upper edges of said side walls and slidingly overlapping the upper edge of said rear wall, all of said wall members being readily disassociated for collapsing said cage; a spring actuated trap door pivotally mounted between said side wall members for closing over the entry end of said cage, a sear formed on said trap door, a trip plate, pivotally connected to said sidewall members, adjacent said base member for arcuate movement and selectively engageable at one end with said sear for holding said door in an open position, and a weighted striker bar, pivotally mounted between said sidewall members, above said trip plate, for striking said plate upon falling arcuately downward thereby to release said trip plate and sear and permit closure of said door.

2. A trap of the class described, comprising a hollow cage having an open entry end, an arcuately movable trap door mounted on a horizontal pivotal axis and adapted to close over said entry end, a torsion spring means for urging said door into a vertical closed position over said entry end, a pivotally mounted trip plate within said cage, a stop bolt means limiting upward arcuate movement of said trip plate's one end, the arc of movement described by the other end of said trip plate, which lies closest to its pivotal axis, intersecting the arc of movement described by the lower end of said trap door whereby arcuate movement of said trap plate into abutting engagement with said stop bolt means permits the lower edge of said trap door to overlappingly engage said other end of said trip plate; said spring means tending to urge said door and trip plate to move arcuately toward one another when their adjacent ends are so engaged thereby holding said trip plate's one end abuttingly against said stop bolt means, and a striker bar pivotally mounted in said cage above said trip plate for vertical arcuate movement about a horizontal axis, the upper limit of travel of said bar being defined by a stop lug projecting transversely inward of one of said side walls and the lower limit of travel of said bar being defined by interference with said below positioned trip plate; rotational arcuate movement of said striker bar to strike said plate causing the latter to move arcuately out of engagement with said trap door's lower end thereby releasing said trap door for closing over said entry.

3. In an animal trap for capturing alive, small animals, of the type having a collapsible cage portion consisting of a base, two side walls, a rear end wall and a top wall, all detachably interconnected to form a collapsible rectangular box having an open entry end; the combination comprising, an arcuately movable, pivotally mounted trap door positioned at the cage entry and movable arcuately upward to close over the cage entry, torsion spring means mounted between said door and the cage base for moving said door arcuately upward, and triggering means, for releasably holding said trap door in an open position, including a trip plate pivotally mounted within said cage and movable arcuately into a set position wherein a leading edge thereof underlies a planar sear extension formed on a lower end of said trap door, when the latter is in an open set position, thus interferring with continued closing arcuate movement of said door, an adjustable stop bolt means dependingly mounted vertically on the cage rear wall for engaging the rearward end of said trip plate to regulate and limit its upward arcuate movement and for statically counterbalancing said spring's closure of said door, a pivotally mounted striker bar positioned horizontally over said trip plate and movable to a vertical set position wherein it lies slightly beyond a vertical position, and a pivotally mounted trough member, having a bait well therein, arcuately movable to a set position wherein it rests against said striker bar so that continued rotational movement of said trough toward said striker bar causes the latter bar to fall arcuately downward to strike said trip plate and cause said triggering mechanism to release said trap door for closing over the cage entry.

4. In an animal trap of the type described, a cage, a spring actuated trap door adapted to move arcuately upward from a horizontal open position to a vertical closed position for closing over an entry end of said cage, and a triggering mechanism within said cage for maintaining said door in said open position and for releasing said door for spring actuated closure with said entry in response to interference with a bait associated with said triggering mechanism, said triggering mechanism comprising, a horizontally disposed pivotally mounted striker bar positioned transversely within said cage for vertical arcuate movement, said bar being adapted to rest in a substantially vertical static unbalanced position when said trap is set, a feeding trough mounted adjacent said striker bar for vertical arcuate movement, in a manner similar to said bar, and carrying the bait, said trough resting against said bar in an inclining relation therewith when said trap is set, and a pivotally mounted trip plate positioned below said striking bar and trough within said cage and likewise adapted for vertical arcuate movement, said plate being rotatable about a horizontally disposed transverse pivotal axis located intermediate its ends; a stop bolt mounted dependingly over one end of said plate for limiting the upward arcuate travel thereof and the opposite end of said plate being adapted to underlie an adjacent inner end of said door distinguished by a sear extension thereon, whereby when said door is in an open position said plate's opposite end abuts said sear thereby preventing rotational closing movement of said door until said striker bar falls downwardly to collide with said plate in response to rotational movement of said trough toward said bar, which latter movement causes falling rotation of said bar; said collision of said bar and plate causing upward arcuate movement of said plate's opposite end, thereby moving said opposite end out of engagement with said door's sear to permit spring actuated closure of said door over said entry.

5. In a trap, a boxlike cage having an open end, a spring biased door for closing over said end, said door being hinged on a horizontal axis intermediate its vertical length at a point near the bottom of said cage open end, the bottom limit of the door comprising a sear, a trip plate comprising a tiltable floor of said cage and having a horizontal pivot parallel to the pivot of said door, said trip plate having a shoulder for engaging under the sear of said door, a stop limiting the movement of said trip plate in the direction in which it is urged by the spring loaded door, a weighted striker bar positioned above the trip plate, said bar being pivoted on a horizontal axis which is spaced from the center of gravity of said bar, and said weighted bar being adapted to be set in unstable equilibrium with the center of gravity thereof above its pivot axis, and a pivoted bait holder which leans against said striker bar for support in said set position, said striker bar when overturned striking the trip plate and releasing its shoulder from the sear of said door, whereby the spring-biased door moves to closed position.

6. In an animal trap of the class described, a cage means comprising, a base, a pair of sidewalls, a rear end wall and a top wall all slidingly and detachably interconnected for ready disassembly; a trap door pivotally mounted at the forward entry end of said cage on a horizontal pivot rod received through the sidewalls of said cage, a torsion spring means mounted between said trap door and the base of said cage for resiliently urging said trap door over the entry end of said cage, a resilient leaf spring mounted transversely across the outer end of said trap door, said leaf spring being bowed arcuately outward therefrom for limiting opening movement of said door by resiliently contacting the base of said cage when said door is opened to a substantially horizontal position; a trigger mechanism mounted within said cage for locking said door in its open position against the closing force of said torsion spring, comprising, a trip plate pivotally mounted between the sidewalls of said cage for vertical arcuate movement about a horizontal axis, a stop bolt means, mounted on said cage's end wall, above one end of said trip plate, for limiting upward arcuate movement of the latter's one end; a sear extension, formed at the lower end of said door and engageable with the other end of said trip plate for holding said door in an open position in setting the trap, a striker bar, pivotally mounted between the sidewalls of said cage for rotation about a horizontal pivotal axis above said trip plate, said bar striking said trip plate during downward swinging motion thereby causing responsive downward movement of said trip plate's one end and moving its other end arcuately upward to disengage from said sear to permit spring biased closure of said door over said cage's entry end; and means for initiating the downward swinging movement of said striker bar in response to attempts of an animal to capture a bait within said cage, comprising a trough member, having a bait retaining well formed therein, pivotally mounted for vertical arcuate movement about a horizontal axis and adjacent said striker bar, said trough, when in its set condition, being inclined in a statically unbalanced position against said striker bar whereby arcuate movement of said trough toward said bar causes the latter to swing downwardly and collide with said trip plate.

7. A trap of the class described, comprising in combination, a hollow cage having an open entry end, a trap door pivotally mounted to said cage for closing over the open entry end thereof, spring means, mounted between said cage and said door, for urging the latter to a closed position over the cage entry, a trip plate pivotally mounted within said cage and adjacent the bottom thereof, for pivotal movement about an axis parallel to said door's pivotal axis, stop means mounted on said cage for limiting upward arcuate travel of one end of said trip plate, a sear formed at the lower end of said door and being lockingly engageable with the other end of said trip plate for biasing said spring and locking said door in an open position, a weighted striker bar, pivotally mounted within said cage and above said trip plate therein, normally positioned in a static unbalanced condition when the trap is set; said bar when moved from its statically unbalanced position falling arcuately downward to strike said plate and release the same from said sear whereby said door is moved over the entry to said cage by said spring means.

VIVIAN C. BLOODGOOD.

REFERENCES CITED

The following references are of record in the file of this patent:

UNITED STATES PATENTS

| Number | Name | Date |
|---|---|---|
| 1,414,948 | Hazen | May 2, 1922 |
| 2,104,332 | Rohde | Jan. 4, 1938 |

FOREIGN PATENTS

| Number | Country | Date |
|---|---|---|
| 21,810 | Great Britain | of A. D. 1913 |